April 28, 1925.  1,535,970
D. WELCH
TREE SAWING APPARATUS
Filed Sept. 8, 1923  2 Sheets-Sheet 1
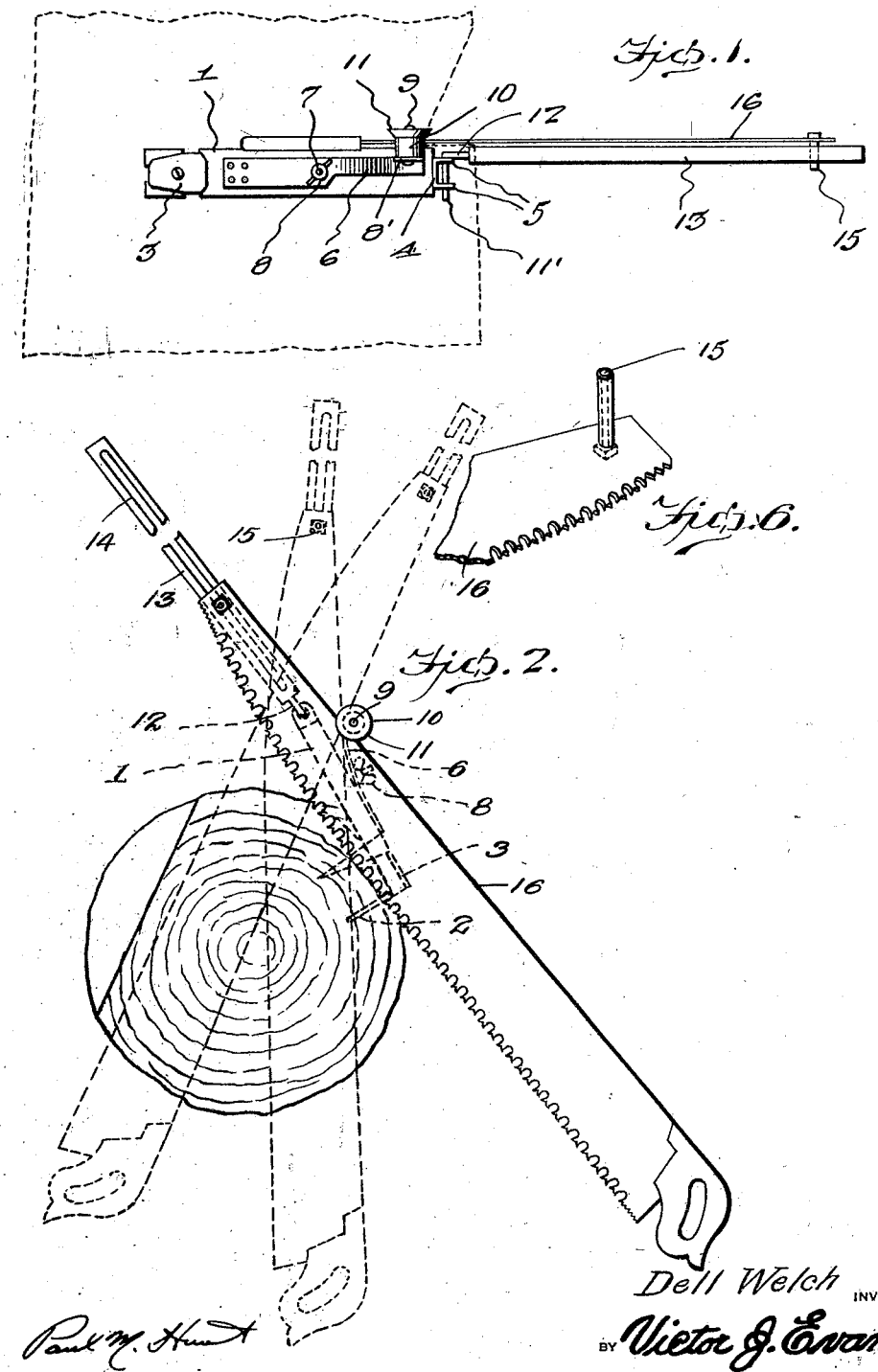

April 28, 1925.

D. WELCH 1,535,970

TREE SAWING APPARATUS

Filed Sept. 8, 1923

Dell Welch INVENTOR

BY Victor J. Evans

ATTORNEY

WITNESS:

Patented Apr. 28, 1925.

1,535,970

UNITED STATES PATENT OFFICE.

DELL WELCH, OF LOZEAU, MONTANA.

TREE-SAWING APPARATUS.

Application filed September 8, 1923. Serial No. 661,645.

*To all whom it may concern:*

Be it known that I, DELL WELCH, a citizen of the United States, residing at Lozeau, in the county of Mineral and State of Montana, have invented new and useful Improvements in Tree-Sawing Apparatus, of which the following is a specification.

My present invention has reference to a tree sawing apparatus.

My primary object is to produce a means whereby trees may be cut by a hand saw actuated by a single operator.

A further object is to produce a saw supporting means designed to be removably attached to a tree to be sawed and which is of such construction as to guide the saw in its cut around and through the tree, to reduce the labor involved in sawing trees, and to permit trees of varying thickness being sawed in an easy manner by a single operator.

To the attainment of the foregoing and other objects which will present themselves as the nature of the invention is better understood, reference is to be had to the drawings which accompany and which form part of this application.

In the drawings:—

Figure 1 is a view illustrating the application of the improvement.

Figure 2 is a top plan view thereof, the tree being in section.

Figure 6 is a fragmentary perspective view of the saw.

Figure 3:
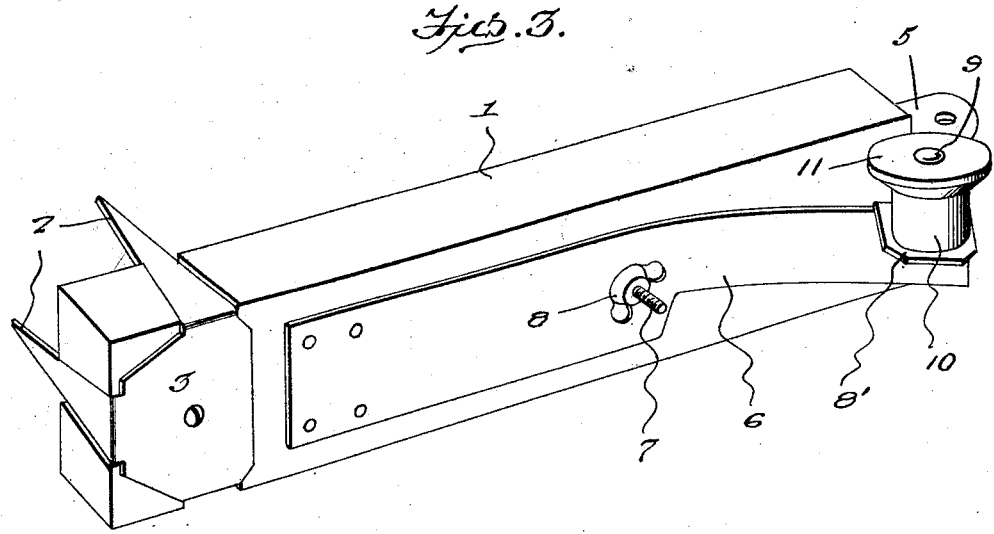
Figure 3 is a perspective view of the body member of the improvement and the element carried thereby.
Figure 4:
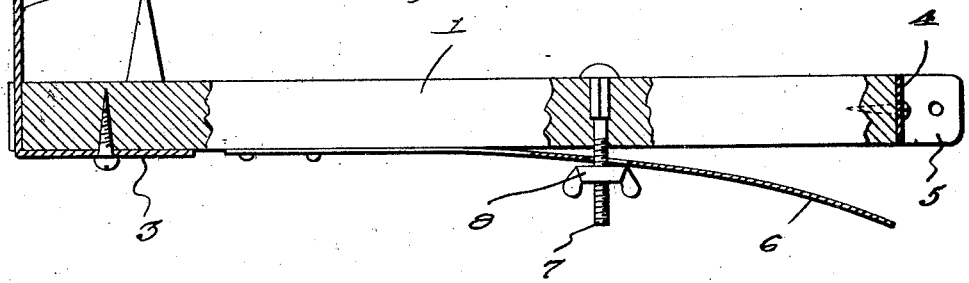
Figure 4 is an approximately central longitudinal sectional view through the said body member.
Figure 5:
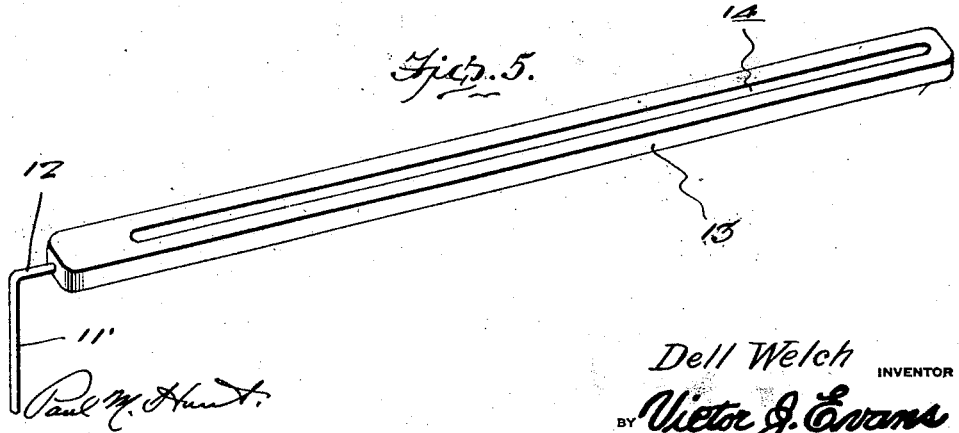
Figure 5 is a perspective view of the saw rest.

As disclosed in Figure 1 of the drawings, either with an axe or with a saw I notch a tree to be sawed. The lower wall of the notch is straight and the upper wall arranged at an inclination. In a line with the lower wall of the notch I spike to the tree the body member 1 of my improvement. The body is preferably constructed of a rectangular piece of wood having its upper and lower edges and its rear notched to receive therethrough substantially V-shaped prongs 2 formed on the edges and outer end of a plate 3 that is screwed or otherwise secured to the body. These prongs are forced into the tree.

On its opposite end there is secured to the body 1 a bracket 4 having its ends formed with outturned ears 5, and the said ears have aligning openings therethrough.

Secured to the outer face of the body 1, at a suitable distance from the prong carrying plate 3 there is one end of a spring plate 6. The plate 6, from its connected end is arched so that the said plate springs away from the body. Passing through the body and through the spring plate 6, at a suitable distance from the end thereof which is connected to the body, there is a bolt 7, and the said bolt is engaged by a winged nut 8. By adjusting the nut, the spring plate may be brought toward or permitted to spring away from the body. On its upper and free end the spring 6 has an angle extension 8 and on this extension there is pivotally secured, as at 9, a tubular member 10 that has its upper edge provided with an outwardly flared flange 11. The flange 11 is projected a suitable distance above the upper edge of the body 1.

Designed to pass through the openings in the ears 5 there is a pin 11' having an upper angle portion 12 that is driven into one end of the saw support 13. The saw support is centrally provided with an elongated opening 14. This opening 14 is designed to receive therethrough a pin 15 which may have arranged thereon a roller. The pin 15 is secured to the saw 16.

The operation of the device will, it is believed, be apparent to those skilled in the art to which this invention relates. The outer non-toothed edge of the saw is brought to contact with the revoluble tubular member or roller 10. When the support 13 is pivotally secured to the body 1 the upper edges of these elements will be in alignment. The spring 6 forces the saw to its work. The hinged connection between the support 13 and the body 1 permits of the saw being moved to cut the tree in a line with the lower wall of the notch and to be moved around the tree. The support 13 will swing as the saw is reciprocated and the saw is so supported that trees of different diameters may be readily cut by a single operator in an easy and expeditious manner.

Having described the invention, I claim:—

1. In a tree sawing apparatus, a body having spikes to be forced into a tree to be cut, a roller on the body, a spring influencing the roller away from the body, means for adjusting the spring with respect to the body, a slotted saw support pivotally secured to the outer end of the body, and said support designed to provide a rest for a saw which is provided with a pin that is received through the slot of said support, as and for the purpose set forth.

2. A tree sawing apparatus comprising a substantially rectangular body having prongs adjacent to its outer end designed to be forced into a tree to be cut, a spring plate having one end secured to the outer face of the body and the remainder thereof designed to spring away from the body, a bolt passing through the body and spring, an adjusting nut on the bolt, said spring having its outer and upper corner flanged, a flanged roller pivotally secured on said flange, a bracket on the outer end of the body, a slotted saw support having a pin provided with an angle extension at one end thereof and said extension designed to be passed through the ears of the bracket, in combination with a saw having a pin to be received in the slot of the saw support, as and for the purpose set forth.

In testimony whereof I affix my signature.

DELL WELCH.